(12) United States Patent
Daoud

(10) Patent No.: US 6,443,457 B1
(45) Date of Patent: Sep. 3, 2002

(54) CABLE SEALING DEVICE FOR VARIOUS CABLE GAUGES

(75) Inventor: Bassel H. Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/539,788

(22) Filed: Mar. 31, 2000

(51) Int. Cl.⁷ .............................................. H02G 15/013
(52) U.S. Cl. ...................... 277/314; 277/609; 277/616; 277/917; 174/65 R
(58) Field of Search ................................. 277/214, 609, 277/616, 626, 627, 917; 174/65 R, 151, 152 G, 153 G, 21 JS, 62, 63; 215/252–253, 256; 385/139, 136

(56) References Cited

U.S. PATENT DOCUMENTS

| | | | |
|---|---|---|---|
| 3,187,966 A | * | 6/1965 | Klygis |
| 3,204,835 A | * | 9/1965 | Michel |
| 3,518,358 A | * | 6/1970 | Brown |
| 4,030,741 A | * | 6/1977 | Fidrych |
| 4,033,535 A | * | 7/1977 | Moran ........................ 248/56 |
| 4,304,957 A | * | 12/1981 | Slater et al. |
| 4,373,112 A | * | 2/1983 | Mizuno |
| 4,512,475 A | * | 4/1985 | Federighi |
| 4,751,350 A | * | 6/1988 | Eaton |
| 5,015,543 A | * | 5/1991 | English |
| 5,360,945 A | * | 11/1994 | Truesdale, Jr. et al. |
| 5,444,183 A | * | 8/1995 | Gehrs et al. |
| 5,465,858 A | * | 11/1995 | Gargione |
| 5,504,276 A | * | 4/1996 | Kunze |
| 5,773,759 A | * | 6/1998 | Hablutzel |
| 5,897,009 A | * | 4/1999 | O'Meara |
| 6,103,973 A | * | 8/2000 | Sharp |
| 6,217,006 B1 | * | 4/2001 | Muller |
| 6,268,565 B1 | * | 7/2001 | Daoud |
| 6,294,734 B1 | * | 9/2001 | Daoud |

* cited by examiner

*Primary Examiner*—Anthony Knight
*Assistant Examiner*—Alison K. Pickard
(74) *Attorney, Agent, or Firm*—Birch, Stewart, Kolasch & Birch, LLP

(57) ABSTRACT

A sealing device for sealing a cylindrical object, such as an electrical or fiber optic cable, includes a base with a first end, a second open end, and an inner wall formed inside the base and connecting the first end to the second open end. The sealing device also includes a cap having one end which is open and another end which is attached to the first end of the base. The one end of the cap includes a first cylindrical recess of a first diameter extending toward the base. In a first embodiment, a hole is drilled through the cap using the first cylindrical recess as a guide. A cable is passed through the hole and a heat shrink wrap assembly is used to seal the cable. In a second embodiment, the cap is removed from the base along a frangible connection. A threaded fastener with a first hole and a gasket with a second hole are provided. A cable is passed through the first and second holes, and the threaded fastener is screw onto the base to seal the cable.

15 Claims, 4 Drawing Sheets

CABLE SEALING DEVICE FOR VARIOUS CABLE GAUGES

BACKGROUND OF THE INVENTION

1. Field of the Invention

The present invention relates to a sealing device.

2. Description of the Relevant Art

Computers or electrical devices are sometimes deployed in surroundings exposed to environmental elements. For example, telephone interface devices may be located on telephone poles, in boxes at a roadside, or under a body of water. Such devices are housed inside sealed enclosures to protect sensitive electrical equipment from exposure to contaminants, such as water, insects and dust.

Often many incoming and outgoing cables, such as electrical cables and fiber optic cables, are connected to the sensitive electrical equipment inside the sealed enclosure and communicate to the world outside the enclosure. Therefore, some arrangement must be provided around the cables to allow the incoming and outgoing cables to enter and exit the enclosure, without violating the sealed integrity of the enclosure.

FIG. 1 illustrates a cable sealing arrangement in accordance with the background art. FIG. 1 is a cross sectional view of an enclosure 12 having a first side wall 1, a second side wall 2, and a upper surface 3. Cable ports 4 are provided on the upper surface 3.

Each cable port 4 includes a continuous cylindrical wall 5 extending upward and away from the upper surface 3. The continuous cylindrical wall 5 is closed by a top wall 6 at an upper end, and the continuous cylindrical wall 5 opens into the interior of the enclosure 12 at a lower end.

The enclosure 12 is initially formed with a plurality of cable ports 4, such as ten.

Each of the cable ports 4 is initially closed by a respective top wall 6. Depending upon the circuitry and functions of the electronics encased within the enclosure 12, a technician determines how many cables, and what gauge cables, are needed to enter/exit the enclosure 12. FIG. 1 illustrates two cables entering/exiting the enclosure. A first cable 7 has a relatively large gauge. A second cable 8 has a relatively small gauge.

Next, cable ports 4, having a continuous cylindrical wall 5 with a diameter appropriate to the gauge of the first and second cables 7, 8, are opened. A cable port 4 is opened by removing its top wall 6 from the continuous cylindrical wall 5. In this example, two top walls 6 have been removed. The top walls 6 are typically removed using a hacksaw.

In the case of the first cable 7, the technician installs a heat shrink wrap assembly onto an end of the first cable 7, and slides the heat shrink wrap assembly up onto the first cable 7. The heat shrink wrap assembly includes a plastic membrane 10 and a melting epoxy 11, within the plastic membrane 10. The technician passes the first cable 7 through the appropriate opened cable port 4. Then, the plastic membrane 10 is slid onto the outer surface of the continuous cylindrical wall 5. Lastly, the technician applies heat to the plastic membrane 10, which causes the melting epoxy 11 to seal the cable port 4.

The cable port 4, according to the background art, suffers drawbacks. Cutting off the top wall 6 takes time and thus delays the assembly process. Also, the sawing off of the top wall 6 can result in sharp burs along the edges of the continuous cylindrical wall 5. Removal of the burs, such as by filing, further delays the assembly time. Leaving the burs can result in damage to the insulation layer, shielding layer and/or conductors within the cables 7, 8.

A further drawback results if the technician cuts the continuous cylindrical wall 5 at a slant. A slanted cut reduces the surface area of the continuous cylindrical wall 5 available for bonding to the melting epoxy 11, and thus reduces the integrity of the seal formed at the cable port 4. An even further drawback is that the upper surface 3 of the enclosure must be initially formed with a plurality of differently sized cable ports 4, in order to be able to accommodate differing gauges of cables.

SUMMARY OF THE INVENTION

Accordingly, it is an object of the invention to provide a system for sealing cables, which overcomes one or more of the drawbacks associated with the background art.

It is a further object of the invention to provide a cable sealing arrangement, which reduces the assembly time required to seal cables entering/exiting the enclosure.

It is an even further object of the invention to provide a cable sealing arrangement, with an improved sealing integrity.

It is an even further object of the invention to provide a uniform cable port design, which can accommodate cables of various gauges.

These and other objects of the invention are accomplished by a sealing device and a method of sealing a cylindrical object, such as an electrical or fiber optic cable, where the sealing device includes a base with a first end, a second open end, and an inner wall formed inside the base and connecting the first end to the second open end. The sealing device also includes a cap having one end which is open and another end which is attached to the first end of the base. The one end of the cap includes a first cylindrical recess of a first diameter extending toward the base. In a first embodiment, a hole is drilled through the cap using the first cylindrical recess as a guide. A cable is passed through the hole and a heat shrink wrap assembly is used to seal the cable. In a second embodiment, the cap is removed from the base along a frangible connection. A threaded fastener with a first hole and a gasket with a second hole are provided. A cable is passed through the first and second holes, and the threaded fastener is screw onto the base to seal the cable.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
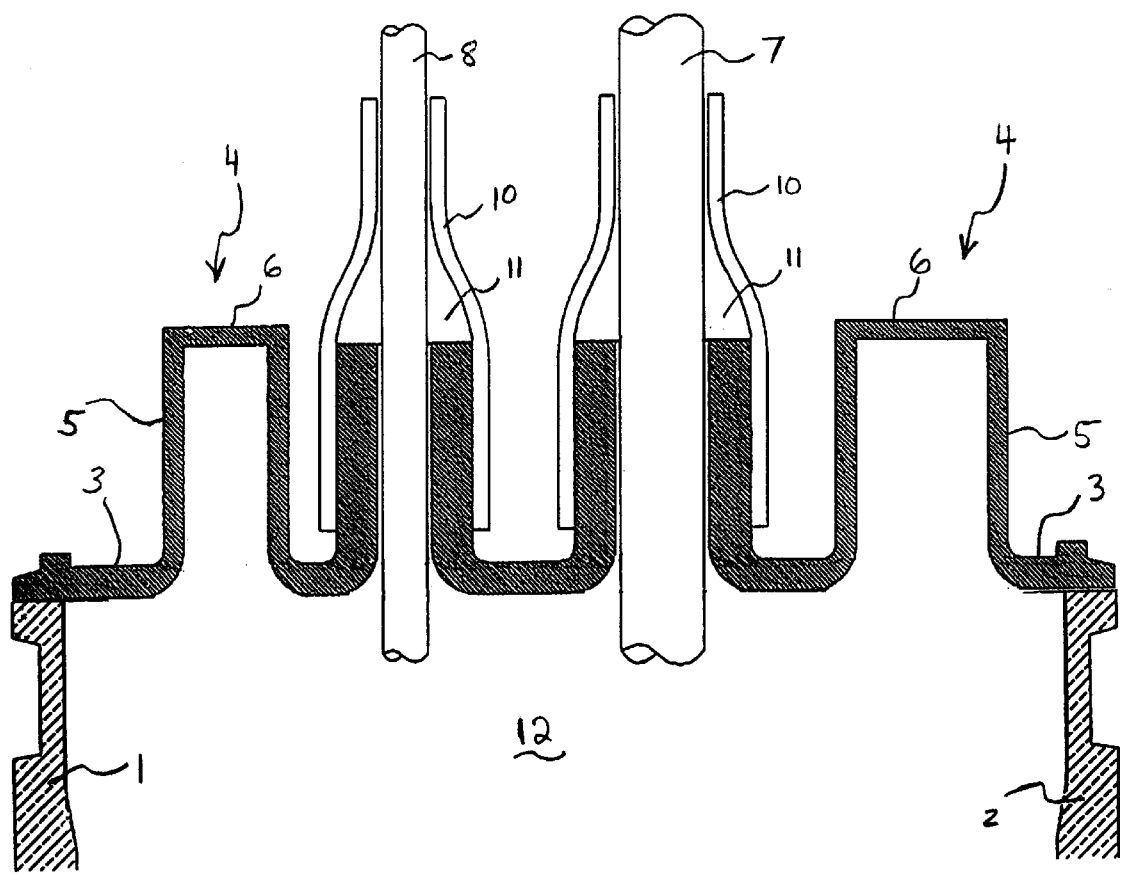
FIG. 1 is a cross sectional view illustrating an enclosure with cable ports, in accordance with the background art.
Figure 2:
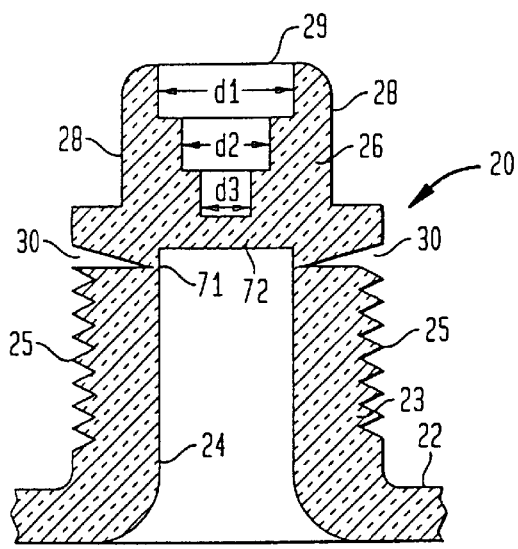
FIG. 2 is a cross sectional view illustrating a closed cable port, in accordance with the present invention.
Figure 6:
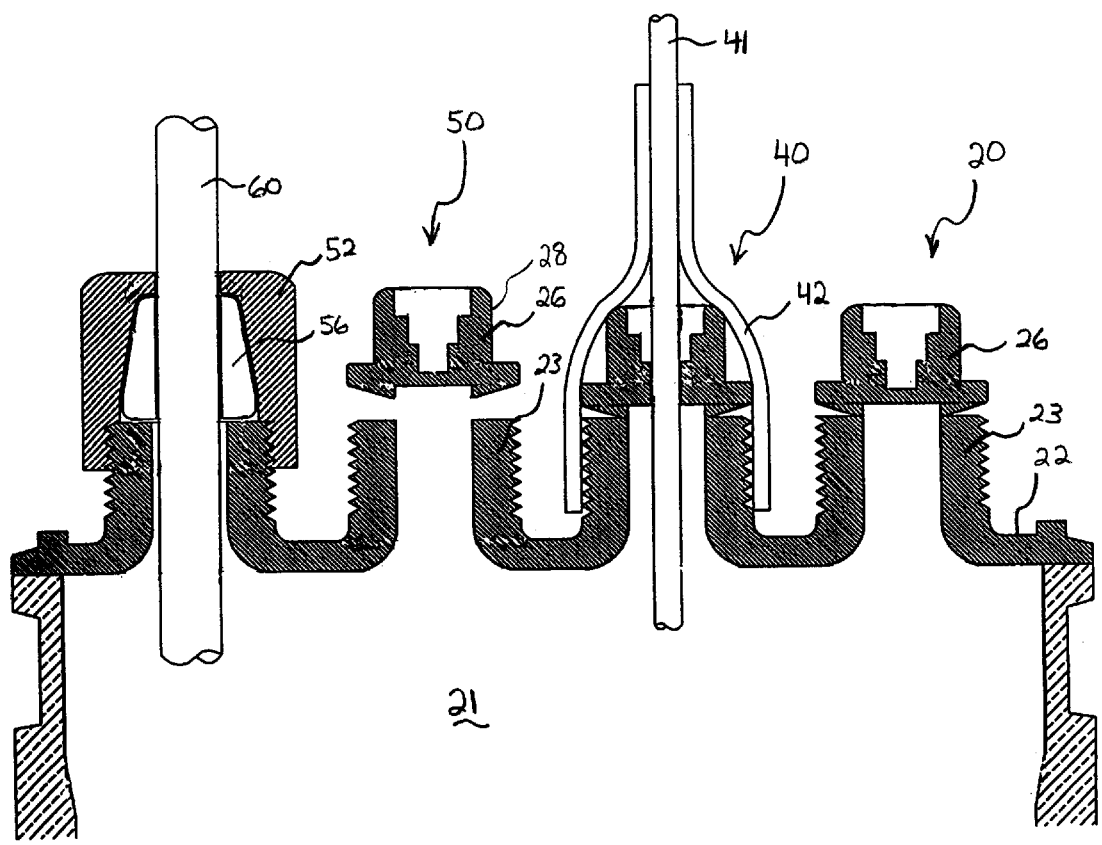
FIG. 6 is a cross sectional view illustrating an enclosure with cable ports, in accordance with the first and second embodiments of the present invention.

FIG. 2 illustrates a closed cable port 20. With reference to FIG. 6, an enclosure 21, in accordance with the present invention, is initially formed with a plurality of closed cable ports 20 on a port surface 22.

The closed cable port 20 has a cylindrical body 23 extending away from the port surface 22. The cylindrical body 23 has a cylindrical inner wall 24 defining a hollow interior. The cylindrical inner wall 24 is a continuous, smooth, straight wall The cylindrical body 23 has first threads 25 formed on a cylindrical outer wall thereof. A first end of the cylindrical body 23 is closed by a cap 26. A second end of the cylindrical body 23 is open and communicates with an interior of the enclosure 21.

The cap 26 is integrally formed with the cylindrical body 23, and connected thereto by a frangible ring 71. Preferably, the frangible ring 71 is initially formed during the fabrication process of the cable port by forming a continuous V-notch 30 around a perimeter of the cylindrical inner wall 24 and/or the cylindrical outer wall of the cylindrical body 23.

An outer surface 28 of the cap 26 includes a tool engaging surface. For example, the outer surface 28 could have a profile, which is hexagonal in shape, as a standard bolt or fastening nut. An interior of the cap 26 is hollow and defined by a stepped inner wall 27. One end 29 of the cap 26 is open to the surrounding environment. Another end of the cap 26 is closed by a bottom wall 72.

The stepped inner wall 27 defines distinct and decreasing diameters from the one end 29 toward the bottom wall 28. In FIG. 2, three decreasing diameters d1, d2, d3 are illustrated. Of course, more or less than three distinct diameters could be defined by the stepped inner wall 27. Alternatively, an infinite number of continuously decreasing diameters between d1 and d3 could be created by replacing the stepped inner wall 27 with an inner wall having a conical shape.

Figure 3:
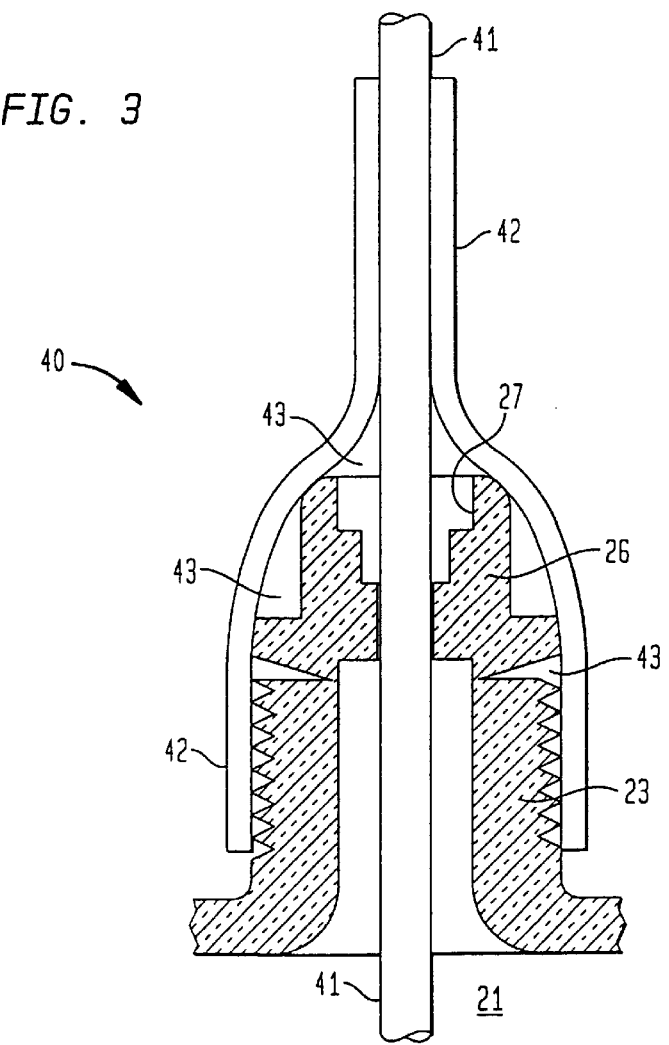
FIG. 3 is a cross sectional view illustrating a cable passing through an open cable port, with sealing components, in accordance with a first embodiment of the present invention.

FIG. 3 illustrates an opened cable port 40 receiving a small gauge cable 41. The closed cable port 20 is transformed into an opened cable port 40 by drilling through the cap 26. When a small gauge cable 41 is intended to pass through a closed cable port 20, the technician selects a drill bit which is slightly less in diameter than the diameter d3, defined by the stepped inner wall 27. A portion of the stepped inner wall 27 corresponding to the diameter d3 is used as a guide for the drill bit in forming a hole through the cap 26. When a medium gauge cable is intended to pass through a closed cable port 20, the technician selects a drill bit which is slightly less in diameter than the diameter d2 defined by the stepped inner wall 27. Now, a portion of the stepped inner wall 27 corresponding to the diameter d2 is used as a guide for the drill bit in forming a hole through the cap 26.

Once the hole is drilled through the cap 26, the small gauge cable 41 is passed through the hole and into the enclosure 21. Electrical connections inside the enclosure 21 can be made as necessary. Next, the technician installs a heat shrink wrap assembly around the small gauge cable 41, the cap 26 and the cylindrical body 23.

The heat shrink wrap assembly includes a plastic outer member 42 and epoxy 43 inside the plastic outer member 42. When heat is applied to the outer plastic member 42, the epoxy 43 melts and a seal is formed around the small gauge cable 41, the cap 26 and the cylindrical body 23.

Figure 4:
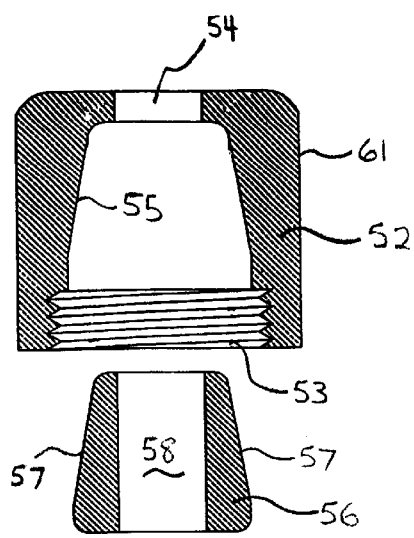
FIG. 4 is an exploded, cross sectional view illustrating an open cable port with sealing components, in accordance with a second embodiment of the present invention.
Figure 4:
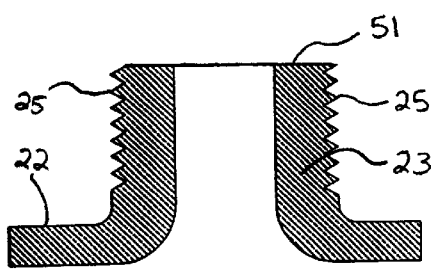

Now, a second embodiment for sealing a cable passing through a cable port will be described in relation to FIGS. 4–6. In FIG. 6, reference numeral 50 indicates the cap 26 removed from the cylindrical body 23 The cap 26 can be removed from the cylindrical body 23 by twisting the cap 26 relative to the cylindrical body 23. This is most easily accomplished by applying a hand tool to the outer surface 28 of the cap 26.

Now, the component parts for the second embodiment for sealing a cable will be described with reference to FIGS. 4 and 5. Once the cap 26 is removed, the first threads 25 are exposed up to a first open end 51 of the cylindrical base 23. A threaded fastener 52 includes a top, an open bottom, and a cylindrical inner wall. Second threads 53 are provided on the cylindrical inner wall. The second threads 53 are sized to engage with the first threads 25.

The inside of the threaded fastener 52 is hollow and defined on the sides by a tapering inner wall 55. A first through hole 54 is formed in the top of the threaded fastener 52. The first through hole 54 opens into the hollow interior of the threaded fastener 52.

The second embodiment further includes a gasket 56, such as a grommet. The gasket 56 has a tapering outer wall 57 for mating with the tapering inner wall 55 of the threaded fastener 52. An outer profile of the gasket 57 resembles a cork. A second through hole 58 passes through a center of the gasket 56.

Figure 5:
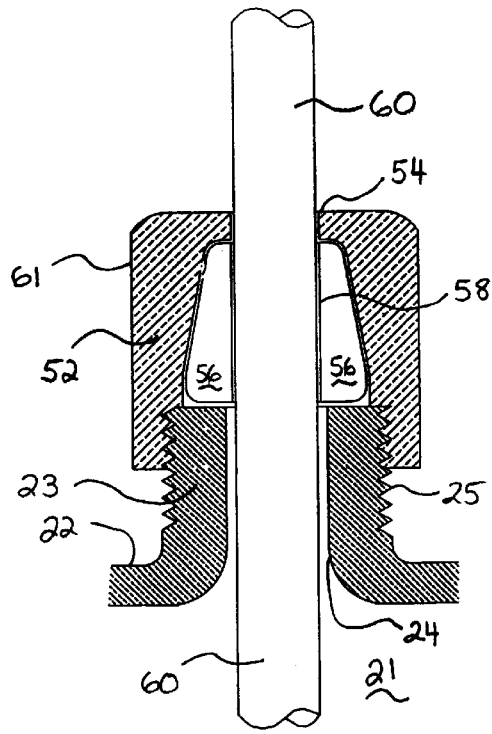
FIG. 5 is an assembled, cross sectional view of the cable port of FIG. 4.

As illustrated in FIG. 5, a large gauge cable 60 extends through the first through hole 54 and the second through hole 58. The large gauge cable 60 then passes through the hollow interior of the cylindrical base 23, defined inside the cylindrical inner wall 24, and into the enclosure 21.

An outer surface 61 of the threaded fastener 52 is formed as a tool engaging surface. For example, the outer surface 61 may have an outer profile of a hexagon, such as a bolt or nut. Tightening of the threaded fastener 52 is accomplished via a hand tool being applied to the outer surface 61. Tightening of the threaded fastener 52 results in pressure contact between the tapering inner wall 55 of the threaded fastener 52 and the tapering outer wall 57 of the gasket 56. The pressure contact causes a seal to form between the large gauge cable 60, the gasket 56, and the threaded fastener 52.

By the above invention, the assembly time required in installing cables into a sealed enclosure is greatly reduced, relative to the background art. The technician no longer needs to saw off the top walls 6 of the cable ports 4. Rather, the present invention offers alternative ways to seal a cable in a quick and secure manner. Further, the present invention allows the cable ports to be formed in a uniform size. The technician can install different gauges of cables in any given cable port.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sealing device for sealing a cable comprising:
   a base including a first end, a second open end, and an inner wall formed inside said base and connecting said first end to said second open end; and
   a cap having one end which is open and another end which is integrally formed with said first end of said base by a frangible member, said one end including a first cylindrical recess of a first diameter formed into said cap and extending toward said base, wherein said first cylindrical recess forms a hole through said cap so as to provide an opening into said bases.

2. The sealing device according to claim 1, wherein said frangible member exists adjacent to a notch extending around a perimeter of said base.

3. The sealing device according to claim 1, wherein said cap includes a tool engaging surface.

4. The sealing device according to claim 3, wherein said tool engaging surface has a hexagonal outer profile.

5. The sealing device according to claim 1, wherein said base further includes a cylindrical outer wall with threads.

6. The sealing device according to claim 1, wherein said first cylindrical recess stops short of said another end of said cap.

7. The sealing device according to claim 6, wherein said one end of said cap further includes a second cylindrical recess of a second diameter formed into said one end and extending toward and stopping short of said another end of said cap.

8. The sealing device according to claim 7, wherein said one end of said cap further includes a third cylindrical recess of a third diameter formed into said one end and extending toward and stopping short of said another end of said cap.

9. The sealing device according to claim 8, further comprising:
   a cable extending through said hole in said cap.

10. The sealing device according to claim 9, further comprising:
    a heat shrink wrap assembly surrounding said cable and at least one of said cap and a portion of said base, wherein said heat shrink wrap assembly forms a seal between said cable and said at least one of said cap and said portion of said base.

11. A method of sealing a cable passing through a cable port, said method comprising the steps of:
    providing a cable port including a base and a cap, the cap including one open end and another end attached to the base, the one end including a first cylindrical recess of a first diameter formed into the one end and extending toward and stopping short of the another end of the cap;
    removing material at the end of the first cylindrical recess so as to extend the first cylindrical recess through the another end of the cap to form a hole extending through the cap;
    inserting the cable through the hole;
    applying a heat shrink wrap assembly to the cable and a portion of the base or cap; and
    heating the heat shrink wrap assembly and thereby sealing the cable to the cable port.

12. The method according to claim 11, wherein said step of removing material at the end of the first cylindrical recess includes drilling a hole through the cap using the first cylindrical recess as a guide.

13. A method of sealing a cable passing through a cable port, said method comprising the steps of:
    providing a cable port including a base and a cap attached to the base, the base including a cylindrical outer surface with first threads;
    moving the cap relative to the base, in order to cause the cap to break free of attachment to the base;
    providing a threaded fastener including a top with a first through hole, an open bottom, and a cylindrical inner wall with second threads;
    providing a gasket with a second through hole;
    inserting the cable through the first and second through holes;
    interposing the gasket between the threaded fastener and the base,
    engaging the second threads with the first threads; and
    tightening the threaded fastener to the base, forming a seal between the cable, the gasket, and the threaded fastener.

14. The method according to claim 13, wherein said step of tightening the threaded fastener includes applying a tool to an outer surface of the threaded fastener.

15. The method according to claim 13, wherein said step of moving the cap includes applying a tool to an outer surface of the cap.

* * * * *